July 6, 1926.
W. A. BOGG
ELECTRIC MOTOR LOCK
Filed Sept. 14, 1925
1,591,606
2 Sheets-Sheet 1
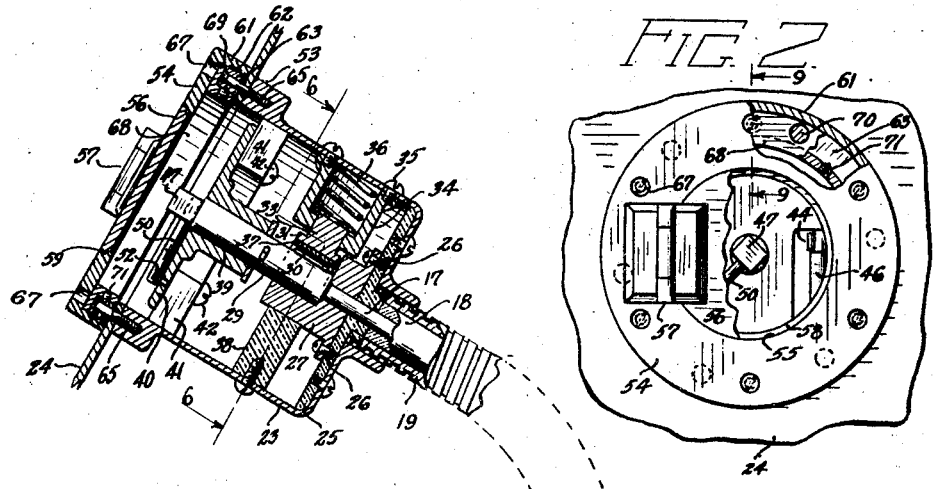
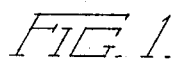
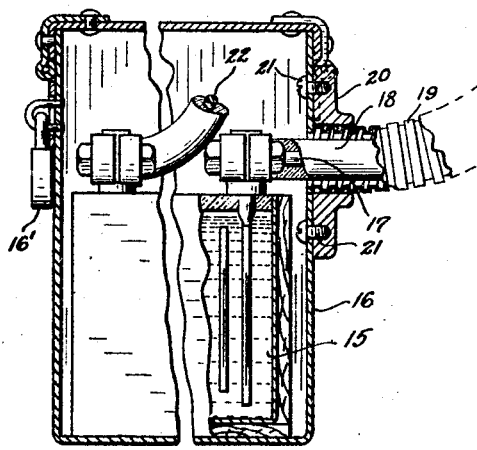
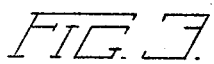
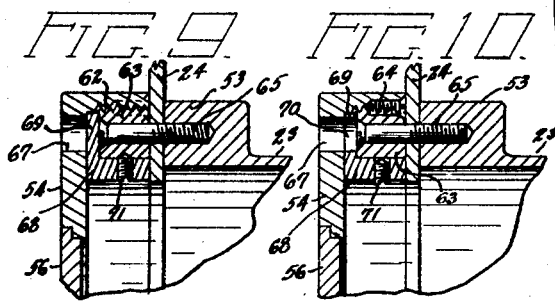
INVENTOR
William A. Bogg
BY
Wooster & Davis
ATTORNEYS.

July 6, 1926.　　　　　　　　　　　　　　　1,591,606
W. A. BOGG
ELECTRIC MOTOR LOCK
Filed Sept. 14, 1925　　　2 Sheets-Sheet 2
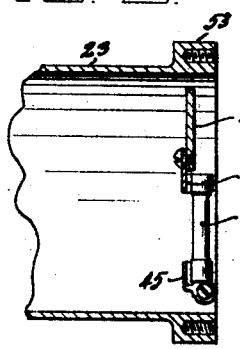
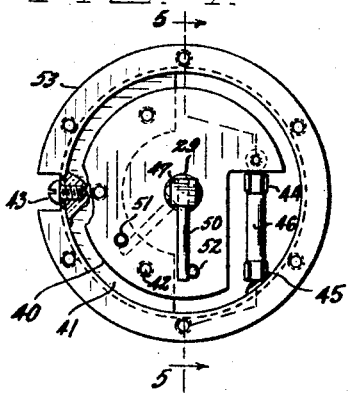
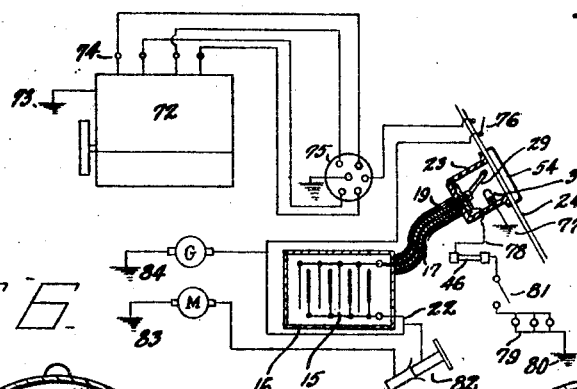
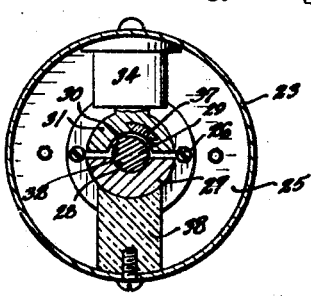
INVENTOR
William A. Bogg.
BY
Wooster & Davis
ATTORNEYS.

Patented July 6, 1926.

1,591,606

UNITED STATES PATENT OFFICE.

WILLIAM A. BOGG, OF FAIRFIELD, CONNECTICUT.

ELECTRIC MOTOR LOCK.

Application filed September 14, 1925. Serial No. 56,392.

This application is a substitute for my prior application for patent for an electric motor lock, filed February 23, 1923, Serial No. 620,666.

This invention relates to devices for locking motor vehicles to prevent stealing or their operation by unauthorized persons, and has for an object to provide simple and effective means for preventing starting of the motor by unauthorized persons.

It is also an object of the invention to provide a device of this character, which, should an attempt be made to start the motor, this tampering with the device will not prevent operation of the motor by the proper party.

It is a further object of the invention to provide a device of this character which will permit the use of parking lights if required.

With the foregoing and other objects in view I have devised the construction illustrated in the accompanying drawings, in which:

Fig. 1 is a longitudinal section through a battery box and my improved locking device showing the connection between the same.

Fig. 2 is a front elevation of the locking device as it appears on the cowl of the machine, portions thereof being broken away to disclose details of construction.

Fig. 3 is a similar view showing certain elements in a different position.

Fig. 4 is a front elevation of the switch mechanism.

Fig. 5 is a longitudinal section thereof substantially on line 5—5 of Fig. 4.

Fig. 6 is a transverse section substantially on line 6—6 of Fig. 1 showing the device in running position.

Fig. 7 is a similar view to Fig. 6 showing the device in locked position.

Fig. 8 is an elevation of a key for operating the switch.

Fig. 9 is a detail section substantially on line 9—9 of Fig. 2.

Fig. 10 is a similar section substantially on line 10—10 of Fig. 3, and

Fig. 11 is a wiring diagram showing the basis of the system of wiring.

In carrying out my invention I take the ground connection for the battery and enclose it in a locked or burglar proof casing, and provide a switch for completing the grounding of the connection and also enclose it in this locked or burglar proof casing, so that the battery cannot be grounded without gaining access to this casing. The battery itself is also enclosed in a locked box or container so that it cannot be grounded independently of the regular ground connection.

Referring to the accompanying drawings, and particularly to Figs. 1 and 11 which show the general layout, the storage battery is indicated at 15, and it is enclosed within a locked box or burglar proof container 16, a conventional form of locking means being shown at 16'. There is a single ground connection from this battery indicated at 17, which is enclosed in an insulating cover 18 and this cover is in turn enclosed within a flexible steel protective conduit 19. This conduit is secured to the battery box 16 in such a manner that it will be difficult to detach therefrom to give access to this ground connection, without gaining access to the battery box. In the present instance I have provided a collar 20 connected to the flexible conduit, and have secured it to a side wall of the battery box by means of screws 21, which are placed in position from the inside of the box and thus cannot be removed without gaining access to the box. The positive connection from the battery is indicated at 22 and leads to the various electrical devices in the usual manner.

The other end of the protective flexible conduit 19 is connected to a burglar proof casing 23. This casing may be mounted on any desired part of a car but preferably is mounted on the cowl, dash or instrument board 24 in front of the driver to which it is grounded in a manner presently to be described, the cowl or the instrument board being in turn grounded on the frame of the machine. The casing 23 is preferably open at one end and closed at the other to which the conduit 19 is secured, and mounted within the casing at this end is an insulating disc 25, through which the ground connection 17 extends. Mounted on this insulating disc within the casing by any suitable means such as screws 26, is a metal block 27, and the end of the ground connection 17 is connected to this block as shown in Fig. 1. The upper portion of this block is semi-cylindrical as shown in Figs. 6 and 7, and is provided with a semi-cylindrical recess 28 in the flat side thereof, which is adapted to receive a cylindrical rod 29. This rod is provided in one side thereof with a longitudinally extending key 30, projecting above the surface of the rod. On the opposite side of this rod from the semi-cylindrical portion of the block 27 is a second semi-cylindrical metal block 31, also provided with a semi-cylindrical recess 32 in its flat side, to receive the other side of the rod 29, but this block 31 is so proportioned and arranged that it is spaced at all points from the metal block 27, so that there will be no electrical connection between them except through the rod 29. The block 31 has a stem 33 guided for longitudinal movement in a metal cylinder 34, which cylinder is secured to the casing 23 by any suitable means such as soldering or screws 35. Within this cylinder is a coil spring 36 which reacts against the casing and the stem 33 and tends to press the block 31 against the rod 29. The block 31 carries a fibre insulating insert 37 at one side of the recess 32 which is adapted to be engaged at certain times by the key 30 to break the electrical connection between the block 31 and the rod 29. On the opposite side of the block 27 from the block 31 I preferably provide an insulating bracing element 38, engaging the block and the casing at its opposite ends to prevent lateral movement of the block 27 under the action of the spring 36, and to take the strain of the spring off the screws 26.

The rod 29 extends outwardly from the block 27 and has a bearing indicated at 39 in a metal plate 40. This metal plate is mounted on a segment 41 of insulating material by any suitable means such as screws 42, this insulating segment being in turn secured to the casing 23 as by a screw 43. The plate 40 is spaced from the casing at all points and is thus insulated therefrom by this segment 41. This plate 40 is, however, provided with a spring clip 44 in alignment with a similar spring clip 45 secured to the casing 23, adapted to carry a fuse 46 to provide electrical connection between the plate 40 and the casing if desired, for the purpose of operating the parking lights of the vehicle, the fuse 46, however, being readily removable. The outer end of the rod 29 above the plate 40 is non-circular in cross section as shown at 47 for insertion in a non-circular socket 48 in a key 49, whereby this rod may be turned to bring the key 30 either into engagement with the metal block 31, as shown in Fig. 6 to complete electrical connection with the same, or to bring this key 30 into contact with the insulating insert 37 as shown in Fig. 7, to break electrical connection between the rod and the block 31. I also preferably provide a pin 50 carried by the rod 29 on the front face of the plate 40, which is movable between two stop pins 51 and 52, and will coact with them to limt movement of the rod 29 in opposite directions, and will also indicate whether the key 30 is in contact with the block 31 or the insulating insert 37. If preferred, instead of using the key 49 for operating the rod or switch 29, a suitable means may be permanently secured to this rod for operating same.

Casing 23 may be secured to the cowl or dash 24 in various ways, but I prefer that as substantially shown, as it makes a connection which is very difficult for an unauthorized person to disconnect for the purpose of securing access to the switches within the casing. Around its open end the casing is provided with a flange 53, which is pressed against the rear wall of the cowl. On the other side of the cowl is a cup 54, provided with an opening 55 which is closed by a suitable door 56, secured to the cup by a strong metal hinge 57. The peripheries of this opening and the door are correspondingly stepped as shown at 58 and 59 to provide a tight fit and allow the front face of the door to become flush with the front face of the cup, and so provide a joint which will make it very difficult to insert a tool to pry open the door. The door may be locked in closed position by means of a suitable Yale lock as indicated at 60. The flange 61 of this cup abuts the front face of the cowl 24, and is internally threaded as shown at 62 for threaded engagement with a securing ring 63. This ring after being inserted in the cup is secured therein against rotative movement by suitable means, such as screws 64. This ring and with it the cup 54 is secured to the cowl by suitable screws 65, passing through the ring 63 and the cowl, and threaded into the flange 53, and thus the cup and the casing 23 are securely clamped on opposite sides of the cowl. The heads of the screws 65 are accessible from the front of the cup through openings 67 in alignment with the screws. In order to prevent removal of these screws by unauthorized persons for the purpose of gaining access to the locked casing and the switches therein, I provide a ring 68 which has an angular recess to receive the ring 63 and thus provides a flange 69 which extends between the outer end of the ring 63 and the front wall of the cup. This flange has openings 70 therethrough which may be placed in alignment with the openings 67 and the screws 65 as shown in Figs. 3 and 10, to allow access to the screws. After the screws are properly set the ring 68 may be rotated to move the openings 70 out of alignment with the openings 67 and the screws 65, and then secured in this position by suitable means such as set screws 71. Thus it will be seen that it would be impossible to pick the ring 68 through the openings 67 to move it around to bring the openings 70 into alignment with the screws.

Referring to Fig. 11 I have shown diagrammatically the relation of my device to the electrical apparatus of the vehicle. At 72 I have indicated the internal combustion engine in outline which of course is grounded, this fact being indicated at 73, and the spark plugs 74 are grounded on the engine in the usual manner. I have indicated in outline at 75 the usual distributor connected with the spark plugs and controlled by the usual ignition switch 76. Within the casing 23 I have indicated the switch comprising the rod 29 as merely a hinged blade for the purpose of simplification. It is connected to the ground connection 17 and the battery 15 and adapted to engage a contact 31 which is grounded as indicated at 77, this contact 31 corresponding to the block 31 of my switch. Leading from the switch 29 is a connection 78, including the automatic switch or fuse 46, connected to the usual parking lights 79, grounded as indicated at 80 and controlled by a lighting switch 81. I have indicated the positive connection 22 of the battery as leading to the starting pedal 82 so that pressure upon the pedal will close the circuit to the starting motor M, which is grounded in the usual manner indicated at 83, and I have indicated at G the generator, also grounded at 84 and connected to the connection 82.

The operation is as follows:

When the operator wishes to lock his car the rod 29 is moved to the position shown in Figs. 2 and 7, with the key 30 in contact with the insulating contact 37. With this switch rod in this position, if the automatic switch or fuse 46 is removed, the ground for the battery will be broken and no current may be secured therefrom for starting the engine, and as the door 56 leading to the casing 23 is locked the machine cannot be operated, as the connection 17 is the only ground connection from the battery and is enclosed within a steel casing so that it will not be easy to gain access to this connection. As still further the battery 15 is in a locked container it will be very difficult for an unauthorized person to ground the battery independently of the connection 17 for the purpose of starting the engine. If the owner wishes to start the engine all he has to do is to move the switch rod 29 to the position shown in Figs. 1, 4 and 6 when the battery will be grounded through the key 30 and the block 31.

The automatic switch or fuse 46 is used only to provide sufficient current for operating parking lights when the car is to be parked in a restricted district. This fuse or switch is readily removable and is of low amperage, say of 4 or 5 amperes or less, which is that required for the parking lights. It will be apparent that this fuse or switch provides a ground for the battery for the purpose of operating the parking lights when the ground switch 29 is turned to the off position shown in Figs. 2 and 7, but this fuse or switch 46 is unable to carry sufficient current for operating the starting motor, and so as soon as the starting pedal 82 is depressed this fuse will be blown, breaking the only ground connection for the battery and thus preventing starting of the motor. This of course will extinguish the parking lights and will indicate to the owner or anyone else that the car has probably been tampered with. It will, however, not prevent the owner's use of the car, because by opening the door 56, the grounding switch 29 may be turned to the on position shown in Figs. 1, 4, and 6, and the car operated as if nothing had happened.

Should the car be left parked with the fuse or switch 46 in position this fuse would carry enough current to operate the ignition device, and the car might be started by towing without operating the starting motor M. However, as the generator under these conditions is connected only to the battery by this small fuse, as soon as the motor is up to speed the voltage of the generator will have increased very rapidly and would soon blow the fuse 46 or destroy the other electrical apparatus. In ordinary operation, however, as indicated above, this automatic fuse or switch 46 is not used, it being intended to employ it only when parking lights are required.

It will be apparent from the foregoing disclosure that the device will be very effective in preventing theft of cars or unauthorized operation thereof. Although it is practically impossible to make locking devices for motor vehicles absolutely thief-proof, still, if it is made very difficult for them to start a car so that considerable time will be required to do this, they are not liable to take the risk of detection that is involved under these conditions. As with this device the wheels or steering gear are not locked the car may be run out of a garage to prevent damage in case of fire.

Having thus set forth the nature of my invention, what I claim is:

1. In combination with a vehicle having an internal combustion engine, an electric starting motor for said engine, a ground connection for said motor, a battery for operating said motor, a connection from one side of the battery to said motor, a control switch in said connection, a burglar proof casing, a single ground connection only from the other side of the battery and leading to said casing, means to prevent access of unauthorized persons to said connection, and a grounding switch for said latter connection located in said casing.

2. In combination with a vehicle having an internal combustion engine, an electric starting motor for said engine, a ground connection for said motor, a battery for operating said motor, a burglar proof casing, a grounding switch for said battery in said casing, a starting switch for said motor, a lighting circuit for said vehicle, and a second grounding switch in said casing connected in the lighting circuit and arranged to automatically open should the starting switch be closed while the first grounding switch is open.

3. In combination with a vehicle having an internal combustion engine, an electric starting motor for said engine, a ground connection for said motor, a battery for operating said motor, a box for enclosing said battery, means for locking said box, a burglar proof casing, an insulated ground connection leading from the battery to said casing, a steel protective means for enclosing said connection, and a grounding switch for said connection in said casing.

4. In combination with a vehicle provided with electrical devices, a battery to supply current for said devices, a grounded casing, a single ground connection only from said battery and leading to said casing, means to prevent unauthorized access to said battery and said connection, a switch in said casing insulated therefrom to which the ground connection from the battery is attached, means adapted to coact with said switch to ground the same on the casing, and means to prevent unauthorized access to said casing.

5. In a device of the character described, a casing, a metal block mounted in said casing and insulated therefrom, a conductor from a source of current supply connected to said block, said block being provided with a recess in one side thereof, a second metal block spaced from the first block and having a recess opposed to that of the first block, an insulating element inlaid in one of said blocks at one side of the recess therein, a cylindrical switch element seated in the other of said recesses and provided with a key projecting from one side of the same adapted to engage the insulating element or the wall of the recess, yielding means tending to press one of the blocks against the switch element, and means for operating the switch element.

6. In a device of the character described, a casing, a movable switch element mounted in said casing and insulated therefrom, a connection from a source of current supply connected with said element, a contact element, means for moving the switch element to and from engagement with the said contact element, an insulating member secured to said casing, a metal supporting element mounted on said insulating member and having electrical connection with the switch element, and means carried by the supporting element and the casing for removably supporting a fuse.

7. In a device of the character described, a casing, a metal block mounted in the casing and insulated therefrom, a conductor from a source of current supply connected to said block, a switch element rotatably mounted in said block, a contact element carried by the casing, means carried by the switch element for engaging said contact and movable to and from engagement therewith by turning the switch element, an insulating member secured to the casing, a metal supporting element mounted on said insulating member and having a bearing for said switch element, and means carried by the supporting element and the casing for removably supporting a fuse.

8. In a device of the character described, a support, a casing open at one end, switch elements mounted in said casing, a conductor from a source of current supply connected to one of said elements, means for securing the casing to the support comprising a cover for said open end and having an internally threaded flange about its periphery, a securing ring having threaded engagement with said flange, screws extending through said ring and support and threaded in said casing, said cover having openings in alignment with said screws, a rotatable ring having a flange portion between the securing ring and the cover, said flange portion being provided with openings which may be brought into alignment with said screws or moved away therefrom, means for securing said rotatable ring in adjusted positions, a door in said cover, and means for locking said door.

9. In a device of the character described, a casing open at one end, switch elements mounted in said casing, a conductor from a source of current supply connected to one of said elements, a cover for the open end of said casing, releasable means for securing the cover to the casing, said cover having openings in alignment with said securing means, an independently movable member mounted between the openings in the cover and said securing means and provided with openings which may be brought into alignment with said securing means or moved away therefrom, means accessible only from the interior of the casing for securing said movable member in adjusted positions, means allowing access to the interior of the casing, and means for locking said latter means.

In testimony whereof I affix my signature.

WILLIAM A. BOGG.